United States Patent

[11] 3,597,013

[72] Inventor Shantilal N. Shah
Pittsburgh, Pa.
[21] Appl. No. 813,030
[22] Filed Apr. 3, 1969
[45] Patented Aug. 3, 1971
[73] Assignee Westinghouse Air Brake Company
Wilmerding, Pa.

[54] VARIABLE-LOAD BRAKE CONTROL APPARATUS
15 Claims, 3 Drawing Figs.

[52] U.S. Cl. .................................................. 303/22, 303/40
[51] Int. Cl. .................................................. B60t 8/18
[50] Field of Search ........................................ 303/22, 22 A, 40, 6; 188/195

[56] References Cited
UNITED STATES PATENTS
2,450,464  10/1948  Bent ........................... 303/22
2,940,796  6/1960  Ortmann et al. ............... 303/22
2,950,147  8/1960  Neubeck ....................... 303/22
3,456,990  7/1969  Page et al. .................... 303/22

*Primary Examiner* — Milton Buchler
*Assistant Examiner* — John J. McLaughlin
*Attorneys* — Adelbert A. Steinmiller and Ralph W. McIntire, Jr.

ABSTRACT: A railway car variable load brake control apparatus having a fluidic-jet load-sensing mechanism for interposition between a spring-supported (or sprung) part and an unsprung part of a car truck, the operation of which at the time of effecting a brake release provides a supply of fluid the pressure of which is in accordance with the weight of the load carried by the spring-supported part, this pressure being used to adjust the brake control apparatus to provide a braking force on the car in accordance with the load carried thereon.

INVENTOR.
SHANTILAL N SHAH
BY
A.A. Steinmiller
ATTORNEY

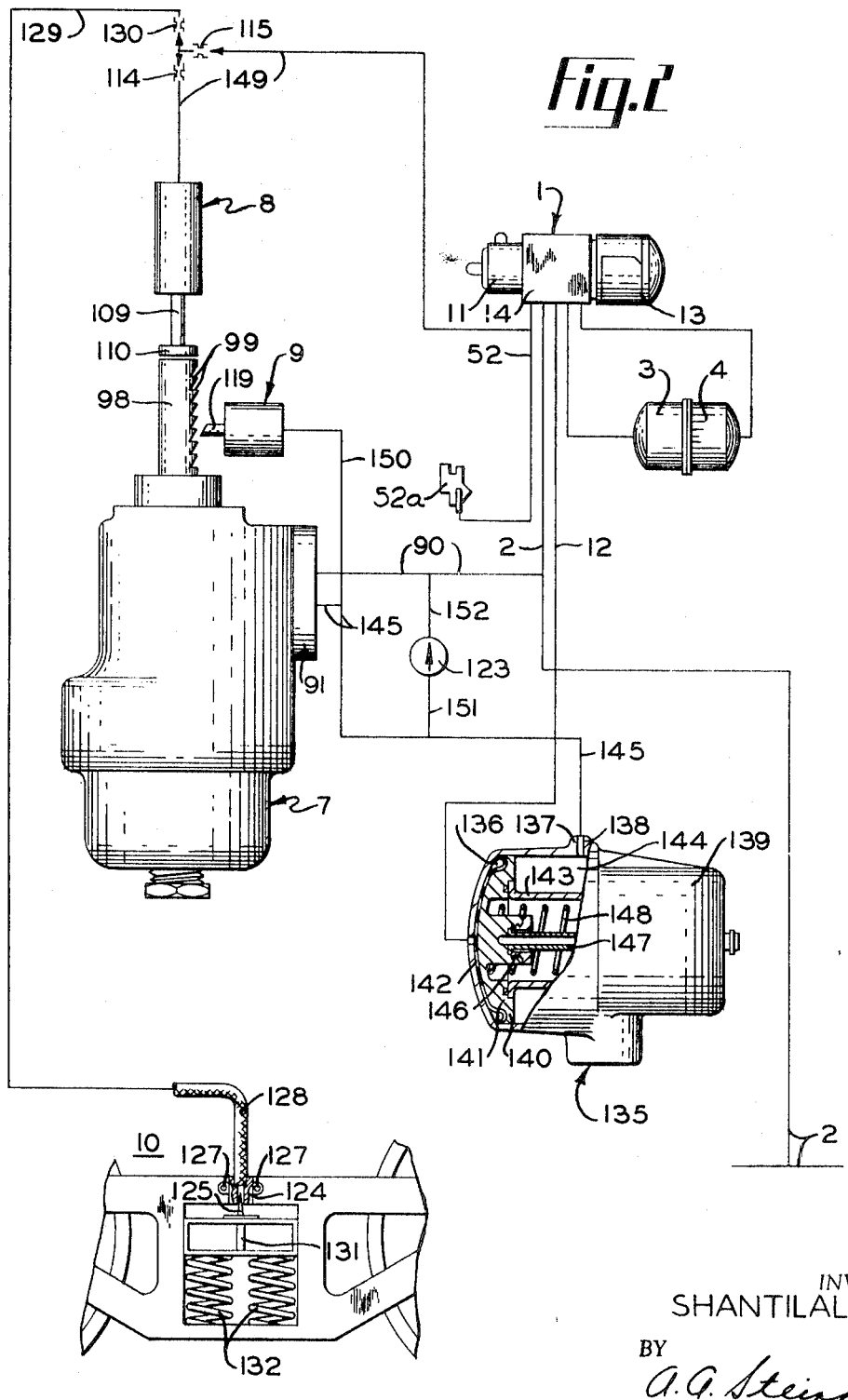

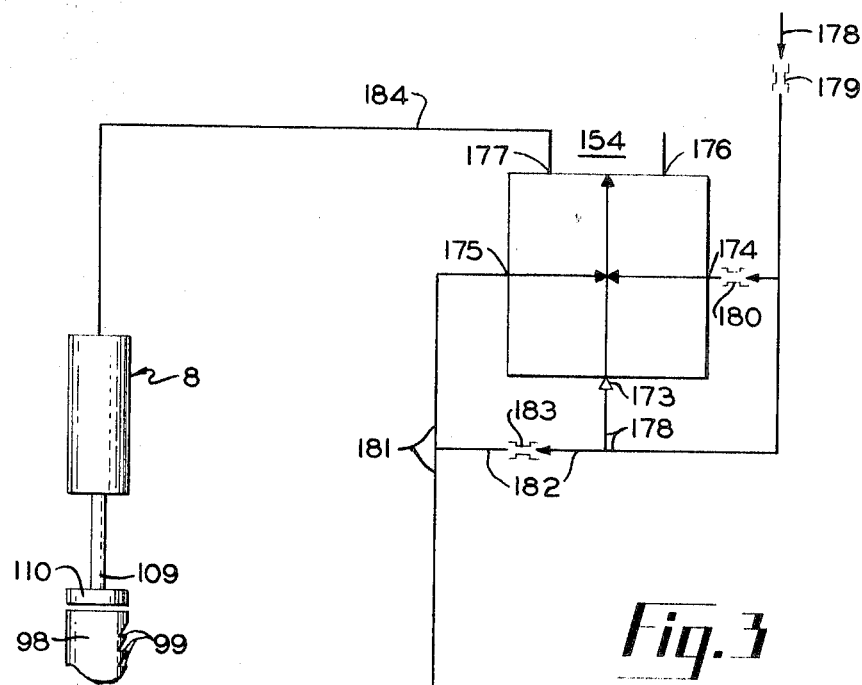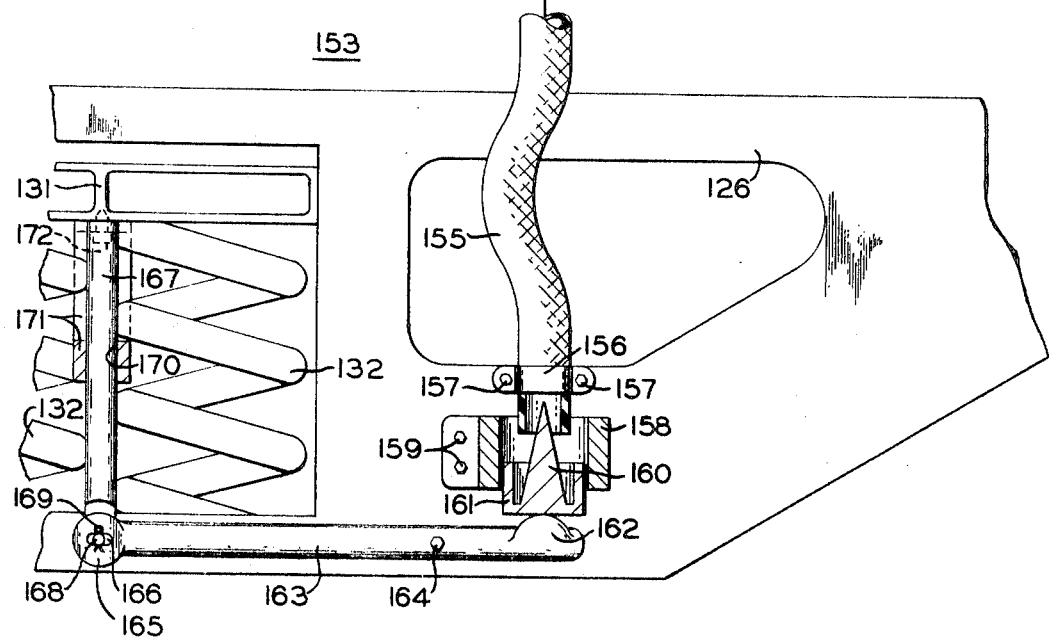

VARIABLE-LOAD BRAKE CONTROL APPARATUS

BACKGROUND OF THE INVENTION

In heretofore-known railway car variable-load brake control apparatus the load-weighing operation has been effected by various types of load-responsive mechanisms some of which are operative in accordance with the amount of spring deflections in response to load upon charging the brake pipe subsequent to an emergency brake application, some of which are adjustable in accordance with changes in pressure in fluid pressure springs interposed between the sprung and unsprung parts of the car, and others of which effect a load-measuring operation at the time of effecting a brake application in response to the supply of fluid under pressure to a brake cylinder. Each of the above-mentioned types of load-responsive brake control apparatus embody large, expensive and complicated valve devices which has necessarily limited the use of variable-load brake control apparatus on railway freight cars in use today on American railroads.

The relatively recent advances in the art of fluidics have brought forth a large number of miniaturized, inexpensive and simple fluidic sensors for detecting changes in variable media external to a fluidic system and providing a signal in accordance therewith.

Accordingly, it is the general purpose of this invention to provide a railway car variable-load brake control apparatus that embodies therein a simple and inexpensive fluidic load sensor which is operable in response to effecting a brake release subsequent to an emergency brake application to reflect the weight of the load carried on a railway car.

SUMMARY OF THE INVENTION

According to the present invention, a weighing operation of the load on a railway car is effected by a miniaturized fluidic load sensor which is operated each time a brake release is made subsequent to an emergency brake application to move a fluid motor piston to effect operation of a self-lapping type of valve device the output pressure of which varies according to car load, and in cooperation with brake cylinder pressure supplied from a conventional brake control valve device, determines a pressure differential for operating a differential type of relay valve device to control the pressure in a brake cylinder.

In the accompanying drawings:

FIG. 2 is a diagrammatic view of a second embodiment of the invention embodying a variable-load railway car brake equipment which is identical to that of the first embodiment of the invention except for the omission of the differential type relay valve device and the substitution of a compensating type of brake cylinder for the conventional type of brake cylinder shown in FIG. 1.

Figure 1:
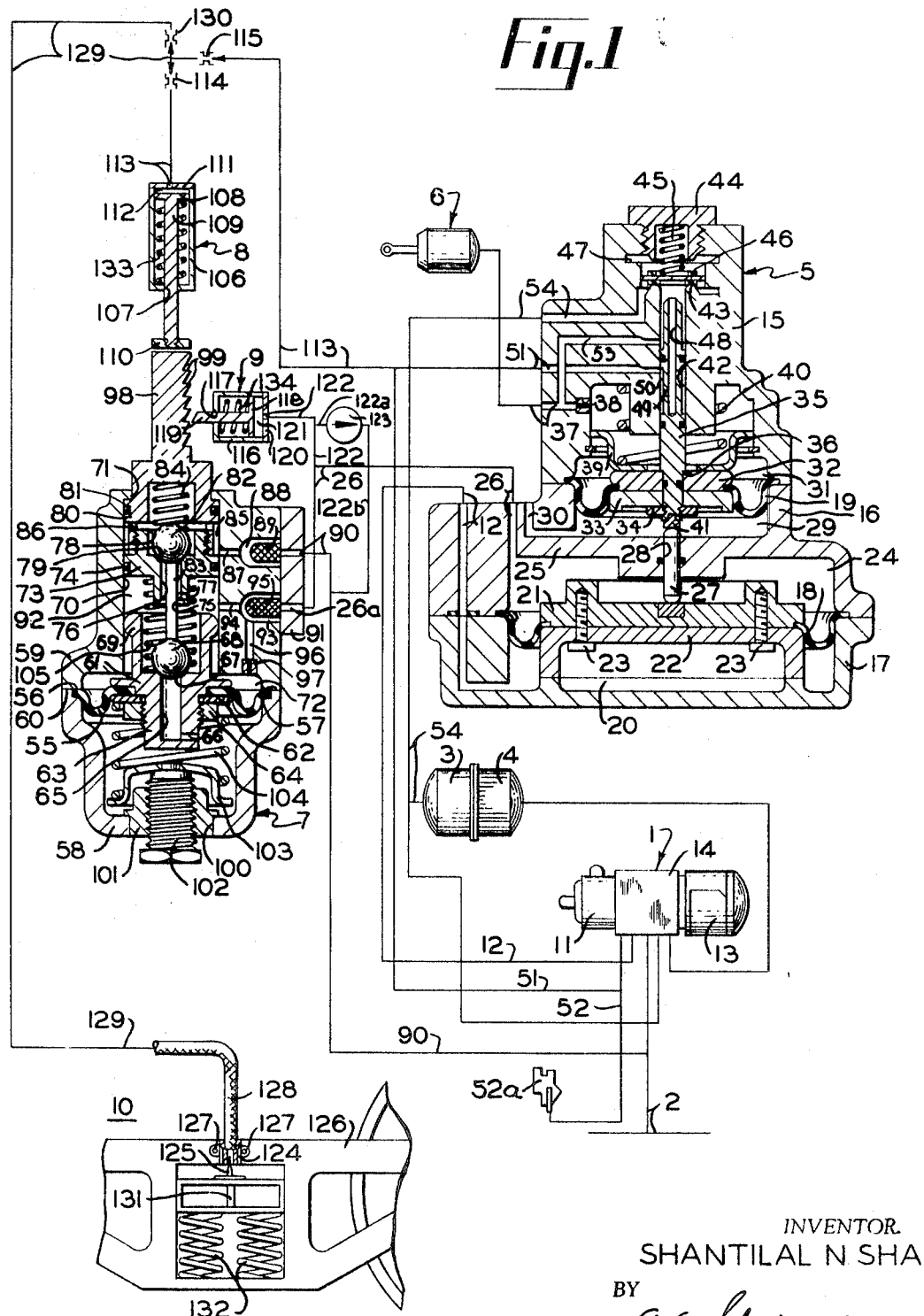
FIG. 1 is a diagrammatic view, partly in section, showing a variable-load railway car brake equipment constructed in accordance with one embodiment of the invention and including a novel fluidic load sensor means.

FIG. 3 is a partial diagrammatic view of a third embodiment of the invention embodying a variable-load railway car brake equipment which is identical to that of the first embodiment of the invention except for the provision of a proportional amplifier in the load sensor means and a lever arrangement for proportioning the movement of the needle valve relative to the corresponding fluid jet in accordance with the deflection of the car springs.

In FIG. 1 of the drawings, there is shown a variable-load fluid pressure brake equipment constructed in accordance with one embodiment of the invention. This variable-load fluid pressure brake equipment comprises a brake control valve device 1 to which is connected the usual brake pipe 2, auxiliary reservoir 3, emergency reservoir 4, and a self-lapping relay valve device 5 that is operative in a manner hereinafter explained to effect the supply of fluid under pressure from the auxiliary reservoir 3 to a brake cylinder 6.

This variable-load fluid pressure brake equipment further comprises a self-lapping valve device 7, a fluid motor 8 for operating the self-lapping valve device 7, a latching or locking cylinder 9 for locking the self-lapping valve device 7 in the position to which it is actuated by the fluid motor 8, and a jet-type load-sensing apparatus 10.

The brake control valve device 1 shown in FIG. 1 of the drawings is of the AB type which may be of substantially the same construction and has the same operating characteristics as the brake control valve device fully described in U.S. Pat. No. 2,031,213 issued Feb. 18, 1936 to Clyde C. Farmer, and assigned to the assignee of the present invention, in view of which it is deemed unnecessary to show and describe this valve device in detail.

Briefly, however, the brake control valve device 1 comprises a service portion 11 adapted to operate upon both a service and an emergency rate of reduction in pressure of fluid in brake pipe 2 for supplying fluid under pressure from the auxiliary reservoir 3 to a brake cylinder pipe 12 which is connected to the self-lapping relay valve device 5 to cause the operation thereof to effect the supply of fluid under pressure from the auxiliary reservoir 3 to the brake cylinder 6 to cause a service application of the brakes on a vehicle. The brake control valve device 1 also comprises an emergency portion 13 which is adapted to operate only upon an emergency rate of reduction of pressure of fluid in the brake pipe 2 for supplying fluid under pressure from the emergency reservoir 4 to the brake cylinder pipe 12 and thence to the relay valve device 5 wherein such fluid, in addition to that supplied from the auxiliary reservoir 3 by operation of the service portion 11, provides a higher pressure than when effecting a service brake application to operate the self-lapping relay valve device 5 to cause the supply of fluid at a corresponding higher pressure to the brake cylinder 6 to effect an emergency brake application on the vehicle. Upon recharging the brake pipe 2, the brake control valve device 1 is adapted to operate to open pipe 12 to atmosphere for releasing fluid under pressure therefrom and from the relay valve device 5 to cause this relay valve device to operate to release fluid under pressure from the brake cylinder 6 thereby releasing the brakes on the vehicle, and at the same time to effect recharging of the auxiliary reservoir 3 and the emergency reservoir 4 in the usual well-known manner. The service and emergency portions 11 and 13, respectively, of the control valve device 1 are mounted on opposite faces of a pipe bracket 14 to which all pipe connections to the valve device are made, as shown in FIG. 1 of the drawings.

The self-lapping relay valve device 5 comprises a sectionalized casing that embodies three casing sections 15, 16, 17 secured together by any suitable means (not shown) and two coaxially arranged movable abutments or diaphragms 18 and 19 of different effective areas cooperatively, through not positively, connected so as to constitute a stack, as will be understood from subsequent description. The larger movable abutment 18, the outer periphery of which is clamped between the casing sections 16 and 17, has at one side a chamber 20 to which the hereinbefore-mentioned brake cylinder pipe 12 is connected via a corresponding passageway extending through the casing sections 16 and 17.

A diaphragm follower 21 is operatively connected to the center of the diaphragm 18 by means such as a diaphragm follower plate 22 and a plurality of capscrews 23, only two of which appear in FIG. 1 of the drawings, that pass through corresponding smooth bores in the diaphragm follower plate 22 and have screw-threaded engagement with coaxial screw-threaded bottomed bores in the diaphragm follower 21. The diaphragm 18 cooperates with the casing sections 16 and 17 to form within the relay valve device 5 and on opposite sides of the diaphragm the chamber 20 and a chamber 24 that is formed by the cooperative relationship of the diaphragm 18, the diaphragm follower 21, and a casing partition 25 that constitutes a part of the casing section 16. The chamber 24 is connected by a passageway and corresponding pipe 26 to a delivery chamber hereinafter described in the self-lapping valve device 7. A cylindrical pusher stem 27 arranged coaxially with the movable abutments 18 and 19 has sealing, slidably guided contact with the wall of an aligned bore 28 extending through the casing partition 25 and coaxial with the diaphragms 18 and 19. The casing partition 25 separates the chamber 24 from an atmospheric chamber 29 that is open to the atmosphere via a passageway 30 formed in the casing section 16. The outer periphery of the diaphragm 19 is clamped between the casing sections 15 and 16 and this diaphragm cooperates with the casing section 15 to form a chamber 31 above the diaphragm 19. The inner periphery of this diaphragm 19 is clamped between an annular diaphragm follower 32 and an annular diaphragm follower plate 33 which is secured against the diaphragm follower 32 by a nut 34 that has screw-threaded engagement with screw threads formed on the lower end of a valve stem 35. A portion of reduced diameter formed on the lower end of the stem 35 provides a shoulder 36 against which the diaphragm follower 32 is forced by the nut 34.

Opening into the chamber 31 is one end of a passageway 37 having therein a choke 38 which passageway extends through the casing section 15 and is connected by a correspondingly numbered pipe to the brake cylinder 6. Disposed within the chamber 31 between the casing section 15 and a hollow spring seat 39, is a spring 40 for biasing the spring seat 39 against the diaphragm follower 32 and thereby urging the diaphragm 19 and the diaphragm follower plate 33 together with the stem 35 in a downward direction so that a wear pin 41 carried in the lower end of the stem 35 abuts the upper end of the pusher stem 27.

As shown in FIG. 1 of the drawing, the valve stem 35 extends through a bore 42 formed in the casing section 15. The bore 42 opens at its lower end into the chamber 31 and has formed at its upper end an annular valve seat 43. The casing section 15 is provided with a screw-threaded bore coaxial with bore 42, for receiving therein a cap nut 44. A spring 45 is interposed between the capnut 44 and the upper side of a flat disc-type valve 46 disposed in a chamber 47 formed in casing section 15 to bias the flat disc-type valve 46 downward into contact with the annular valve seat 43 except when unseated therefrom, in a manner hereinafter described.

The upper end of the stem 35 is provided with a portion of reduced diameter into which extends a bottomed bore 48, the bottom of which is open via a radial port 49 to a peripheral annular groove 50 formed on the stem 35. While the stem 35 occupies the position in which it is shown in FIG. 1, the interior of the bottomed bore 48 is connected via the port 49 and the peripheral annular groove 50 to a passageway and correspondingly numbered pipe 51 which is connected to a pipe 52 one end of which is connected to a retaining valve device 52a of the usual well-known construction and the opposite of which is connected to the brake cylinder exhaust port of the brake control valve device 1. Opening at the wall surface of the bore 42 above the location at which the passageway 51 opens at the wall surface of this bore 42 is one end of a passageway 53 which extends through the casing section 15 and opens into the hereinbefore-mentioned passageway 37 therein.

As shown in FIG. 1 of the drawings, opening into the hereinbefore-mentioned chamber 47 in the self-lapping relay valve device 5 is one end of a passageway 54 that extends through the casing section 15 and is connected by a correspondingly numbered pipe to the auxiliary reservoir 3 in order that the chamber 47 may be constantly supplied with fluid under pressure from the auxiliary reservoir 3.

The self-lapping valve device 7 comprises a diaphragm 55 the outer periphery of which is disposed in an annular groove 56 formed in a flat top surface 57 on a bottom cover 58 secured to a casing 59 by any suitable means (not shown) and is clamped between this bottom cover 58 and the casing 59 that has a flat bottom surface 60 that abuts the flat top surface 57 on the bottom cover 58.

The inner periphery of the diaphragm 55 is clamped between a combined diaphragm follower and exhaust valve seat member 61 and an annular diaphragm plate 62 through which a screw-threaded stem 63 extends to receive a screw-threaded nut 64 which is tightened against the annular diaphragm plate 62.

The above-mentioned combined diaphragm follower and exhaust valve seat member 61 is provided with a bottomed bore 65 the lower end of which is open to the periphery of the stem 63 by a port 66 and the upper end of which has formed thereon an annular exhaust valve seat 67.

While the parts of the self-lapping valve device 7 occupy the position in which they are shown in FIG. 1 of the drawings, a ball-type exhaust valve 68 is seated on the seat 67.

The combined diaphragm follower and exhaust valve seat member 61 is provided on its upper side with a cylindrical skirt portion 69 which is slidably guided in a corresponding counterbore 70 formed in the casing 59 and coaxial with a bore 71 in this casing. The lower end of this counterbore 70 opens into a chamber 72 formed by the cooperative relationship of the diaphragm 55 and the casing 59.

Sealingly and slidably mounted in the counterbore 70 above the skirt portion 69 of the combined diaphragm follower and exhaust valve seat member 61 is a supply valve seat piston member 73 that is provided with a peripheral annular groove in which is disposed an O-ring 74 that forms a seal with a wall surface of the counterbore 70 to prevent flow of fluid under pressure from each side of the piston member 73 to the other. The supply valve seat piston member 73 is provided with a bore 75 and a coaxial counterbore 76. The lower end of the counterbore 76 is open to the interior of the counterbore 70 via a port 77 and the upper end of this counterbore 76 opens into a second counterbore 78 and has an annular supply valve seat 79 formed thereon. The upper end of the supply valve seat member 73 is provided with external screw threads that have screw-threaded engagement with corresponding internal screw threads formed on the interior of a cup-shaped piston number 80 that is slidably mounted in the counterbore 70. This cup-shaped piston member 80 is provided with a peripheral annular groove in which is disposed an O-ring 81 that forms a seal with the wall surface of the counterbore 70 to prevent leakage of fluid under pressure from the lower side of the piston member 80 to atmosphere via the bore 71 in the casing 59.

Disposed in the counterbore 78 is a ball-type supply valve 82 that is connected by a stem 83 to the ball-type exhaust valve 68. This supply valve 82 is biased in the direction of its valve seat 79 by a spring 84 that is interposed between the cup-shaped piston member 80 and the valve 82.

It can be seen from FIG. 1 that the cup-shaped piston member 80 cooperates with the supply valve seat piston member 73 and with the wall surface of the counterbore 70 to form an annular chamber 85 which is open to the interior of the counterbore 78 via a plurality of arcuately spaced ports 86 in the cup-shaped piston member 80. The chamber 85 is connected via a passageway 87 formed in the casing 59 to a chamber 88 also formed in this casing 59. A strainer device 89 is disposed in the chamber 88 into which opens one end of a passageway 90 that extends through a pipe bracket 91 to which the valve device 7 is secured by any suitable means (not shown). This passageway 90 is connected by a correspondingly numbered pipe to the brake pipe 2.

Likewise, it can be seen from FIG. 1 that the supply valve seat piston member 73 cooperates with the cylindrical skirt portion 69 of the combined diaphragm follower and exhaust valve seat member 61 and with the wall surface of the counterbore 70 to form a chamber 92. This chamber 92 is connected to a delivery chamber 93 formed in the casing 59 via a passageway 94, the delivery chamber 93 having therein a strainer device 95. As is also shown in FIG. 1, the chamber 93 is connected to the chamber 72 above the diaphragm 55 via a passageway 96 having therein a choke 97. The hereinbefore-mentioned pipe 26 is connected to the chamber 93 via a passageway 26a extending through the pipe bracket 91.

As shown in FIG. 1 of the drawing, integral with the cup-shaped piston member 80 and extending upper from the upward end thereof is a rack member 98 on which is formed a plurality of serrations 99 for a purpose hereinafter explained.

As shown in FIG. 1, the bottom cover 58 is provided with a bore 100 into which is press-fitted a flanged plug 101 that has a screw-threaded bore for receiving a screw-threaded adjusting screw 102 on the upper end of which is a portion of reduced diameter that extends through a bore formed in a cup-shaped spring seat 103. A control spring 104 is interposed between the spring seat 103 and the diaphragm plate 62, it being understood that spring 104 is effective to bias the exhaust valve seat 67 in the direction of the exhaust valve 68.

As shown in FIG. 1 of the drawing, a spring 105 is disposed in surrounding relation to the stem 83 and interposed respectively, between a shoulder formed by the lower end of the interior of the skirt member 69 and the lower side of the supply valve seat piston member 73. It will be noted that the force of this spring 105 is transmitted to the cup-shaped member 80 via the supply valve seat piston member 73 to normally bias the piston member 80 against a shoulder formed by the upper end of the counterbore 70. It also should be noted that the strength of the springs 84 and 104 are such as to normally maintain the supply valve 82 seated on its seat 79 and the exhaust valve 68 seated on its seat 67, respectively.

The fluid motor 8 comprises a cup-shaped body 106 the lower end of which is provided with a bore 107. Slidably mounted in the cup-shaped body 106 is a piston 108 having formed integral therewith a piston rod 109 that extends through the bore 107 and is provided on its lower end with screw threads for receiving thereon a disc 110 having an internally threaded bore. As shown in FIG. 1, the upper end of the cup-shaped body 106 is closed by a cover member 111 secured to the body 106 by any suitable means (not shown). The piston 108, the cup-shaped body 106 and the cover member 111 cooperate to form a chamber 112 which is connected by a passageway and corresponding pipe 113 to the hereinbefore-mentioned pipe 51 intermediate the ends thereof and therefore to the self-lapping relay valve device 5. Disposed in this pipe 113 in series relation are two chokes 114 and 115.

The locking cylinder 9 comprises a cup-shaped casing 116 having therein a bore 117. Slidably mounted in the cup-shaped casing 116 is a piston 118 that has formed integral therewith a piston rod 119 that extends through the bore 117 to the exterior of the casing 116. The exterior end of the piston rod 119 is tapered on one side so as to fit in any one of the serrations 99 in the rack member 98 to thereby lock this member and likewise the self-lapping valve device 7 in an adjusted position. The open end of the cup-shaped casing 116 is closed by a pressure head 120 which is secured to the casing section 116 by any suitable means (not shown) and which cooperates with the piston 118 and the wall surface of the cup-shaped casing 116 to form a pressure chamber 121. Opening into this pressure chamber 121 is one end of a passageway 122 that is connected by a correspondingly numbered pipe to the hereinbefore-mentioned pipe 26 intermediate the ends thereof.

As shown in FIG. 1, a branch pipe 122a connects the pipe 122 intermediate the ends thereof to the inlet side of a spring-loaded check valve 123. The outlet of this check valve 123 is connected by a branch pipe 122b to the hereinbefore-mentioned pipe 90 intermediate the ends thereof.

The jet-type load-sensing apparatus 10 comprises a nozzle 124 and a needle valve 125. The nozzle 124 is provided with a pair of ears by means of which it may be mounted on an unsprung part of a railway vehicle, such as, for example, a truck side frame 126 by a pair of capscrews 127 and is connected by means of a flexible hose 128 to one end of a pipe 129. The opposite end of the pipe 129 is connected to the hereinbefore-mentioned pipe 113 intermediate the chokes 114 and 115 which are disposed in series in the pipe 113, as hereinbefore stated. A choke 130 is disposed in the pipe 129 intermediate the ends thereof.

The needle valve 125 is mounted by any suitable means on a sprung part of the railway vehicle, such as, for example, a truck bolster 131 in a position below the nozzle 124 and in coaxial alignment therewith. Each end of the truck bolster 131 rests on the top of a pair of truck springs 132, only one pair appearing in FIG. 1. Each pair of truck springs 132 is supported on the tension member of the corresponding truck side frame 126. Consequently, as the load on the car is increased, the truck bolster 131 and the needle valve 125 mounted thereon are moved downward away from the mouth of the nozzle 124.

When a new railway car that is provided with the variable-load brake control equipment shown in FIG. 1 is completed in a railway car builders shop, this brake equipment is charged with fluid under pressure in the usual manner by connecting a yard-charging plant owned by the car builder to one end of a single car-testing device (not shown) such as that shown and described in Instruction Pamphlet No. 5039-4, Sup. 1, issued May, 1965 (revised Jan., 1967), by Westinghouse Air Brake Company, Wilmerding, Penna., and the other end of the testing device to the brake pipe 2 at one end of the new car it being understood that the angle cock in the brake pipe at the opposite end of the car is closed.

To effect a full-service brake application on the car, the handle of the single car-testing device is moved from its No. 1 charging position to its No. 5 or full-service application position to cause a reduction of pressure in the brake pipe 2 of 20 p.s.i. inch after which the handle is moved to its No. 3 or lap position to prevent a further reduction of the pressure in the brake pipe 2.

The above-mentioned reduction of the pressure in the brake pipe 2 causes the brake control valve device 1 to operate in the manner described in detail in hereinbefore-mentioned U.S. Pat. No. 2,031,213 to effect the supply of fluid under pressure from the auxiliary reservoir 3 to the brake cylinder pipe 12. Fluid under pressure thus supplied to the brake cylinder pipe 12 will flow via the correspondingly numbered passageway to the chamber 20 in the relay valve device 5 and deflect the diaphragm 18 in an upward direction against the yielding resistance of the spring 40. Since this upward deflection of the diaphragm 18 is transmitted to the diaphragm 19 via the pusher steam 27, this causes the stem 35 to move upward so that its upper end first contacts the bottom face of the flat disc-type valve 46 to close communication between the interior of the bore 42 and atmosphere via bottomed bore 48, radial port 49, peripheral annular groove 50, passageway and corresponding pipe 51, pipe 113 having choke 115 therein, pipe 129 having choke 130 therein, hose 128 and nozzle 124, it being noted that the pipe 51 is also open to atmosphere via pipe 52 and retaining valve device 52a which it may be assumed is in its direct exhaust position. As the stem 35 continues to be moved upward, the flat disc-type valve 46 will be unseated from the valve seat 43. By unseating of the flat disc-type valve 46, fluid under pressure from the auxiliary reservoir 3 flows via pipe and corresponding passageway 54 to the chamber 47, thence past the annular valve seat 43 and through the bore 42 to the passageway 53 and thence via the passageway and corresponding pipe 37 to the brake cylinder 6 to provide a buildup of brake cylinder pressure therein.

Fluid under pressure supplied to the passageway 37, in the manner described above, also flows via the choke 38 to the chamber 31 to increase the pressure therein. This increase in pressure is effective to establish a force that acts in a downward direction on the effective area of the upper side of the diaphragm 19. Upon this force slightly exceeding the force acting upward on the diaphragm 18, the valve stem 35 will be moved downward until the spring 45 seats the flat disc valve 46 on the annular valve seat 43. This cuts off flow of fluid under pressure from the auxiliary reservoir 3 to the brake cylinder 6. Furthermore, this seating of the disc-type valve 46 on the annular valve seat 43 is effective to hold the desired pressure of fluid in passageway 53 and hence in the brake cylinder 6.

It will be noted that no fluid under pressure was present in the chamber 24 at the time the above-described service brake application was effected. Therefore, in the above-described operation of the relay valve device 5, fluid under pressure is supplied to the brake cylinder device 6 and chamber 31 until the pressure in this chamber and acting downward on the effective area of the smaller diaphragm 19 establishes a downwardly acting force that is substantially equal to the upwardly acting force established by the fluid under pressure acting in the chamber 20 on the effective area of the larger diaphragm 18. Consequently, a pressure for adequately breaking a fully loaded car is obtained at this time in the brake cylinder 6.

The above-mentioned full-service brake application can now be released by returning the handle of the single car-testing device to its No. 1 or charging position whereupon fluid under pressure will be supplied to the brake pipe 2 until the pressure therein is increased to its normal chosen pressure which may be, for example, 70 p.s.i.

From FIG. 1 of the drawings, it will be noted that fluid under pressure supplied to the brake pipe 2, in addition to flowing to the brake control valve device 1 to cause the service portion 11 thereof to move to its release position to connect the brake cylinder pipe 12 to the pipe 52 which is open to the atmosphere via the retaining valve device 52a in its direct exhaust position, also flows to the chamber 85 in the self-lapping valve device 7 via pipe and corresponding passageway 90, strainer device 89, chamber 88, and passageway 87 thereby charging chamber 85 to the pressure carried in the brake pipe.

Upon the service portion 11 of the brake control valve device 1 connecting the brake cylinder pipe 12 to the pipe 52, fluid under pressure present in the chamber 20 in the relay valve device 5 will flow to atmosphere via passageway and corresponding pipe 12, service portion 11, pipe 52 and the retaining valve device 52a. Consequently, the pressure in chamber 20 will be reduced to atmospheric pressure.

It will be remembered that when the service brake application was effected, fluid under pressure was supplied to the chamber 31 until the force of this fluid under pressure acting downward on the diaphragm 19 balanced the upward force, due to the fluid under pressure in the chamber 20, acting upward on the diaphragm 18 and valve stem 35 via the pusher stem 27. Therefore, as the pressure in the chamber 20 is reduced, the pressure in the chamber 31 will be effective to deflect the diaphragms 19 and 18 downward and move the stem 35 downward so that the upper end of valve stem 35 is moved away from the lower side of the flat disc-type valve 46 which at this time is biased into contact with the annular valve seat 43 by the spring 45. As the upper end of the valve stem 35 is thus moved away from the lower side of the flat disc-type valve 46, the brake cylinder 6 is vented to atmosphere via pipe and passageway 37, passageway 53, bore 42, bottomed bore 48, port 49, peripheral annular groove 50, passageway and corresponding pipe 51, pipe 52 and the retaining valve device 52a.

One end of the passageway 37 opens into the chamber 31 via the choke 38. Therefore, fluid under pressure will be vented from the chamber 31 simultaneously as it is vented from the brake cylinder 6 until the pressure in the chamber 31 is reduced to atmospheric pressure as is the pressure in chamber 20.

Some of the fluid under pressure vented from the brake cylinder 6 and the chamber 31 in the relay valve device 5 via the pathway described above will flow from the passageway and corresponding pipe 51 to the chamber 112 in the fluid motor 8 via the pipe and corresponding passageway 113 and the chokes 115 and 114 disposed in series therein, it being noted that these chokes 115 and 114 serve to reduce the pressure of the fluid supplied to the chamber 112 to a value substantially less than brake cylinder pressure.

It will be noted from FIG. 1 of the drawings that some of the fluid under pressure supplied to the chamber 112 in the manner explained above flows to atmosphere via passageway and pipe 113, choke 114, pipe 129 having choke 130 therein, hose 128 and nozzle 124. Since the new car carries no load, the springs 132 support the truck bolster 131 and the needle valve 125 in the position shown in FIG. 1 in which the upper tapered end of this needle valve extends a maximum distance into the lower end of the nozzle 124. Consequently, the needle valve 125 offers a maximum restriction to the flow of fluid under pressure from the nozzle 124 to atmosphere. Accordingly, it will be apparent that the restriction provided by the needle valve 125 in cooperation with the restriction provided by the choke 130 and the retaining valve device 52a now in its direct exhaust position causes a buildup of pressure of fluid in the chamber 112 of the fluid motor 8.

As the pressure of fluid in the chamber 112 is increased in the manner just explained, it is effective on the upper side of the piston 108 to move this piston, the piston rod 109 and the disc 110 downward against the yielding resistance of a spring 133 disposed about the piston rod 109 and interposed between the lower side of the piston 108 and the bottom of the cup-shaped body 106 of the fluid motor 8. As the piston 108, piston rod 109 and disc 110 are thus moved downward, the disc 110 is moved into contact with the upper end of the rack member 98 after which further downward movement is against the combined yielding resistance of the spring 133 and the spring 105 of the self-lapping valve device 7 it being noted that the spring 104 is stronger than the spring 105. Therefore, as the spring 105 is compressed by the fluid under pressure supplied to the chamber 112, the supply valve seat member 73 and supply valve seat 79 are moved downward away from the supply valve 82 until the combined resistance of the springs 133 and 105 balance the fluid pressure force acting on the upper side of the piston 108 of fluid motor 8.

Upon movement of supply valve seat 79 downward out of seating contact with the supply valve 82, the fluid under pressure supplied from the brake pipe 2 to the chamber 85 in the manner hereinbefore explained, and thence to the interior of counterbore 78 via ports 86, flows past the now-unseated supply valve 82 and thence to the chamber 24 in the relay valve device 5 via the counterbore 76, port 77, chamber 92, passageway 94, chamber 93, strainer device 95, passageway 26a, and pipe and corresponding passageway 26.

Some of the fluid under pressure thus supplied past the unseated supply valve 82 and thence to the chamber 93 flows therefrom to the chamber 72 via the passageway 96 and choke 97 at a rate controlled by the size of this choke. As fluid under pressure is thus supplied to the chamber 72, the pressure in this chamber is increased. Since the effective area of the upper side of the diaphragm 55 is subject to the pressure in chamber 72, when the pressure in this chamber is increased sufficiently to overcome the resistance of the control spring 104, the diaphragm 55 will be deflected downward against the yielding resistance of the control spring 104. As the diaphragm 55 is thus deflected downward, the combined diaphragm follower and exhaust valve seat member 61 having formed thereon exhaust valve seat 67 is likewise moved downward whereupon the spring 84 is rendered effective to move the supply valve 82, stem 83, and exhaust valve 68 downward until the supply valve 82 is moved into seating contact with its seat 79, it being understood that this spring 84 maintains the exhaust valve 68 seated on its seat 67 during this downward movement.

From the foregoing, it is apparent that as the rack member 98, cup-shaped piston member 80 and supply valve seat piston member 73 are moved downward by fluid under pressure supplied to the chamber 112 of the fluid motor 8 to effect unseating of the supply valve 82, fluid under pressure is supplied to the chamber 24 in the relay valve device 5 and to the chamber 72 above the diaphragm 55 to increase the pressure in these chambers in accordance with the amount of downward movement imparted to the rack member 98, cup-shaped piston member 80, and supply valve seat piston member 73. It is also apparent that the increase in pressure in the chamber 72 operates the self-lapping valve device 7 to a lap position in which the supply valve 82 is reseated on its seat 79 to cut off the flow of fluid under pressure from the source of supply, which is the brake pipe 2, to the chamber 72 in the valve device 7 and to the chamber 24 in the self-lapping relay valve device 5.

It will be apparent from FIG. 1 that some of the fluid under pressure supplied to the pipe 26 by operation of the self-lapping valve device 7 in the manner described above, flows from this pipe 26 to the chamber 121 in the locking cylinder 9 via pipe and passageway 122 so that the pressure in chamber 121 is increased simultaneously as the pressure in the chamber 24 in the relay valve device 5 is increased and to the same final pressure as is obtained in the chamber 24. As the pressure in the chamber 121 is thus increased, it is effective on the right-hand side of the piston 118 to move this piston and the piston rod 119 in the direction of the left hand against the yielding resistance of a spring 134 disposed about the piston rod 119 and interposed between the left-hand side of the piston 118 and the end of the cup-shaped casing 116 until the tapered end of the piston rod 119 is moved into one of the serrations 99 on the rack 98.

It may be noted that further downward movement of the rack 98 can be effected by the fluid motor 8. However, this rack 98 cannot be moved upward so long as fluid under pressure is present in the chamber 121. Accordingly, it is apparent that the self-lapping valve mechanism of the valve device 7 is locked by the locking cylinder 9 in whatever position this valve mechanism is moved to by the fluid motor 8 and thereafter is maintained in this locked position subsequent to the complete venting of fluid under pressure from the chamber 112 to atmosphere via passageway and pipe 113 having choke 114 therein, pipe 129 having choke 130 therein, hose 128 and nozzle 124.

From the foregoing, it is apparent that when the hereinbefore-described full-service brake application on a new railway car that carries no load is subsequently released, the fluid under pressure released from the brake cylinder 6 is effective to operate the fluid motor 8 to cause the self-lapping valve device 7 to operate to supply a maximum pressure of fluid from the brake pipe 2 to the chamber 24 in the self-lapping relay valve device 5 thereby conditioning this valve device to effect, when subsequently operated, the buildup of that pressure in the brake cylinder 6 that provides an adequate braking force on the empty car.

Let it now be supposed that the new railway car is coupled into a railway train to be hauled from the car builder's shop to the property of the railway company for which it was built. Let it be further supposed that while thus en route, a full-service brake application on all cars in the train is effected by reducing the pressure in the train brake pipe in the usual manner from, for example, 70 p.s.i. to 50 p.s.i.

The above-mentioned reduction of the pressure in the brake pipe 2 causes the brake control valve device 1 to operate to effect the supply of fluid under pressure from the auxiliary reservoir 3 to the chamber 20 in the relay valve device 5 in the manner hereinbefore described until a pressure of 50 p.s.i. is obtained in the chamber 20 it being assumed that the volume of this chamber 20 is sufficient to provide for obtaining this equalization pressure upon connecting the auxiliary reservoir 3 to this chamber.

It will now be noted that the diaphragm 18 is subject to a differential fluid pressure force which is the result of the difference in the pressures in the chambers 20 and 24 and is acting in an upward direction over the effective area of the diaphragm 18. Consequently, this differential fluid pressure force effects the deflection of the diaphragm 18 in an upward direction against the yielding resistance of the spring 40 to cause the relay valve device 5 to operate in the manner hereinbefore described in detail to effect the supply of fluid under pressure from the auxiliary reservoir 3 to the brake cylinder 6 and the chamber 31 until the pressure in the chamber 31 establishes a fluid pressure force that acts in a downward direction on the effective area of the diaphragm 19 that slightly exceeds the differential fluid pressure force acting upward on the effective area of the diaphragm 18 whereupon the relay valve device 5 is operated to its lap position to cut off further flow of fluid under pressure from the auxiliary reservoir 3 to the brake cylinder 6. Consequently, a minimum pressure, or that for an empty car, is obtained at this time in the brake cylinder 6 thereby providing the proper braking force on the new empty car.

Let it now be supposed that this new empty car is set off from the train on a siding where it is to be partially or fully loaded. When this empty car is thus set off from the train, the brake pipe 2 will be completely vented of fluid under pressure.

Upon thus completely venting the brake pipe 2, fluid under pressure present in the chamber 121 in the locking cylinder 9 will flow to atmosphere via the passageway and pipe 122, branch pipe 122a, check valve 123, branch pipe 122b, pipe 90 and the brake pipe 2 it being understood that an angle cock (not shown) in the brake pipe 2 at one end of the car occupies its open position. It will also be noted that at this time the fluid under pressure present in the chamber 24 in the relay valve device 5 will flow to atmosphere via passageway and pipe 26, pipe 122, branch pipe 122a, check valve 123, branch pipe 122b, pipe 90 and brake pipe 2 until all fluid under pressure is released from chamber 24.

Also, upon thus completely venting the brake pipe 2, the brake control valve device 1 will operate in the manner explained in hereinbefore-mentioned U.S. Pat. No. 2,031,213 to cause an emergency brake application on the empty car it being noted that, upon thus effecting an emergency brake application, the brake control valve device 1 operates to connect both the auxiliary reservoir 3 and the emergency reservoir 4 to the chamber 20 in the relay valve device 5 to thereby obtain a higher equalization pressure in this chamber and a correspondingly higher brake cylinder pressure in the brake cylinder 6.

It being noted that no fluid under pressure is present in the chamber 24, the relay valve device 5 will now operate in the manner hereinbefore described to effect the supply of fluid under pressure from the auxiliary reservoir 3 to the brake cylinder 6 and to the chamber 31 until the pressure in this chamber and acting on the effective area of the upper side of the diaphragm 19 establishes a force that acts in a downward direction and slightly exceeds the force acting upward on the diaphragm 18 whereupon the relay valve device 5 will be operated to its lap position to cut off flow from the auxiliary reservoir 3 to the brake cylinder 6. Consequently, a maximum pressure is obtained in the brake cylinder 6 at this time. Since the car is now at rest on a siding, there is no sliding of the car wheels.

When fluid under pressure is released from the chamber 121 in fluid motor 9 to atmosphere, as explained above, the spring 134 is rendered effective to move the piston 118 and piston rod 119 in the direction of the right hand thus withdrawing the tapered end of this piston rod 119 from a corresponding serration 99 in the rack member 98. This withdrawal of the tapered end of the piston rod 119 unlocks the self-lapping valve device 7 whereupon the springs 105 and 104 cause the elements of this valve device to return to the position shown in FIG. 1.

It may be noted that as the load on the car is increased, it is effective via one end of the truck bolster 131 to compress or deflect the corresponding pair of car springs 132 so that this bolster 131 and the needle valve 125 carried thereon are moved downward relative to the nozzle 124 which is carried on the unsprung truck side frame 126. Accordingly, it is apparent that as the load on the car is increased, the needle valve 125 is moved downward relative to the nozzle 124. Therefore, this needle valve 125 provides a maximum restriction to the flow of fluid under pressure from the nozzle 124 when the car is empty and a minimum or no restriction to this flow when the car is fully loaded.

From the foregoing, it will be understood that the nozzle 124 and needle valve 125 cooperate to cause, upon effecting a brake release, the establishment of a pressure in the chamber 112 of the fluid motor 8 that varies inversely as the load on the car.

Furthermore, it will be understood that the self-lapping valve device 7 is operable in accordance with the momentary pressure established in the chamber 112 to establish a corresponding pressure in the chamber 24 of the relay valve device 5 and is locked by the locking cylinder 9 to maintain this pressure in the chamber 24 until the pressure in the brake pipe 2 is reduced to a certain chosen value dependent upon the pressure at which the check valve 123 opens.

Let it be supposed that while the car is setting on the siding, it is fully loaded. Consequently, this load is effective to deflect the car springs 132 and move the truck bolster 131 and needle valve 125 downward to the position in which the upper end of this needle valve is disposed below the mouth of the nozzle 124. In this position of the needle valve 125, it provides no restriction to the flow of fluid under pressure from the nozzle 124 to atmosphere.

Let it be now supposed that this loaded car is picked up from the siding and connected into a train. When thus connected into the train, fluid under pressure will flow from the charged train brake pipe to the brake pipe 2 on the car and thence to the brake control valve device 1 on this car. As the brake pipe 2 is thus charged, the control valve device 1 operates in response thereto to release fluid under pressure from the chamber 20 in the relay valve device 5 to atmosphere until the pressure in this chamber 20 is reduced to atmospheric pressure.

As fluid under pressure is thus released from the chamber 20, the relay valve device 5 operates in the manner hereinbefore described to release fluid under pressure from the brake cylinder 6 to the pipe 51. Fluid under pressure supplied from the brake cylinder 6 to the pipe 51 flows therefrom to atmosphere via pipe 113 having choke 115 therein, pipe 129 having choke 130 therein, hose 128 and nozzle 124, it being noted that the needle valve 125 offers no restriction at this time to the flow of fluid under pressure from the nozzle 124 to atmosphere. Consequently, there will be no buildup of fluid pressure in the chamber 112 of the fluid motor 8. Accordingly, fluid motor 8 is not operated to cause operation of the self-lapping valve device 7 to effect the supply of fluid under pressure from the brake pipe 2 to the chamber 24 in the relay valve device 5 at the time the previously effected emergency brake application is released.

If now the pressure in the brake pipe 2 is reduced in the usual manner, the brake control valve device 1 on the now fully loaded car will operate to establish a pressure in the chamber 20 of the relay valve device 5 corresponding to the degree of reduction of pressure effected in the brake pipe 2.

It being remembered that only atmospheric pressure is at this time present in the chamber 24, the pressure in the chamber 20 of the relay valve device 5 will now operate this relay valve device 5 in the manner hereinbefore described to effect the supply of fluid under pressure from the auxiliary reservoir 3 to the brake cylinder 6 and the chamber 31 until the pressure in the chamber 31 is increased sufficiently to establish a downwardly acting fluid pressure force on the effective area of the smaller diaphragm 19 that slightly exceeds the upwardly acting fluid pressure force on the effective area of the larger diaphragm 18 whereupon the relay valve device 5 will be operated to its lap position to cut off further supply of fluid under pressure to the brake cylinder 6.

From the foregoing, it is apparent that the pressure obtained at this time in the brake cylinder 6 is adequate to provide the braking force necessary to properly brake the loaded car.

In view of the above, it is apparent that if the car is partially loaded, the upper end of the needle valve 125 is not disposed below the mouth of the nozzle 124 but extends into the nozzle a distance that varies inversely as the weight of the load on the car. Accordingly, the position of the needle valve 125 relative to the nozzle 124 determines the degree of pressure built up in the chamber 112 of the fluid motor 8, which, in turn, determines the pressure built up in the chamber 24 of the relay valve device 5 in response to operation of the self-lapping valve device 7 by the fluid motor 8. It will be understood from the hereinbefore-described operation of the relay valve device 5 that, as the pressure in the chamber 24 is increased, the pressure obtained in the brake cylinder 6 is decreased. In other words, establishing a pressure in the chamber 24 that varies inversely as the weight of the load on the car, insures that the pressure established in the brake cylinder 6 will provide a braking force on the car in accordance with the load carried thereon.

In FIG. 2 of the drawings, there is shown variable-load fluid pressure brake equipment constructed in accordance with a second embodiment of the invention. According to this second embodiment of the invention, the variable-load fluid pressure brake equipment shown in FIG. 2 differs from the variable-load fluid pressure brake equipment shown in FIG. 1 only in that the self-lapping relay valve device 5 is omitted and the single chamber brake cylinder 6 is replaced by a two-chamber compensating-type brake cylinder 135 to transmit a braking force, variable in accordance with the load on the car, for effecting a brake application. Accordingly, like reference numerals have been used to designate the structure shown in FIG. 2 which is identical to that shown in FIG. 1. Only such features of the structure and operation of the embodiment of the invention shown in FIG. 2 which differ from that of the embodiment of FIG. 1 will be hereinafter described.

According to the embodiment of the invention disclosed in FIG. 2, the variable-load fluid pressure brake equipment shown in this figure comprises the brake control valve device 1 to which is connected the usual brake pipe 2, auxiliary reservoir 3 and emergency reservoir 4, the fluid motor 8, the jet-type load-sensing apparatus 10, and the compensating-type brake cylinder 135.

One end of the brake cylinder pipe 12 is connected to the brake cylinder passageway in the pipe bracket 14 of the brake control valve device 1, as in the first embodiment of the invention shown in FIG. 1 of the drawings, and the opposite end of this pipe 12 is connected to a main pressure chamber 136 in the compensating-type brake cylinder 135 which will now be described in detail.

The compensating-type brake cylinder 135 comprises a hollow cup-shaped casing 137 to the open end of which is secured an annular pressure head 138 from which projects a hollow cup-shaped nonpressure head 139. A brake cylinder piston 140 is slidably mounted in the casing 137 and at one side or the front side thereof is the hereinbefore-mentioned main pressure chamber 136. The brake cylinder piston 140 comprises a piston head 141 to one side of which is connected a flexible packing cup 142 for preventing leakage of fluid under pressure from the pressure chamber 136 to the opposite side of the piston. Secured at one end to and projecting from the piston 140 in a direction away from the pressure chamber 136 is a hollow stem 143 the opposite end of which is provided with a ring packing (not shown) which is slidable in the nonpressure head 139 for preventing leakage of fluid under pressure from a compensating pressure chamber 144 formed around said stem 143 between the pressure head 138 and the piston 140, to a nonpressure chamber (not shown) formed within said stem 143 and open to the interior of the nonpressure head 139 and thence to atmosphere through a port (not shown) in the nonpressure head 139. The chamber 144 is open to a pipe 145 which is connected to the passageway 26a (not shown) in the pipe bracket 91 (FIG. 1). Fluid under pressure is adapted to be supplied to and released from chamber 144 by operation of the self-lapping valve device 7 when it is operated in a manner hereinafter described.

The piston head 141 is provided with a hollow boss 146 projecting into the hollow stem 143 in coaxial relation to the head 141 and stem 143, and one end of a hollow rod 147 is secured to the hollow boss 146. The hollow rod 147 extends through the nonpressure chamber in the nonpressure head to the exterior thereof. This hollow rod 147 accommodates the usual pushrod (not shown) for connecting the piston 140 to the brake rigging (not shown) of the railway car. Encircling the hollow rod 147 is a brake cylinder release spring 148, one end of which bears against the piston head 141 for moving the brake cylinder piston 140 to the brake release position, in which it is shown in FIG. 2 of the drawings. The opposite end (not shown) of the release spring 148 is supported on the nonpressure head 139.

The pressure chamber (not shown) in the fluid motor 8 is connected to the exhaust pipe 52 intermediate the ends thereof by a pipe 149 which has disposed therein in series relation the two chokes 114 and 115.

The nozzle 124 of the jet-type load-sensing apparatus 10 is connected by the flexible hose 128 and pipe 129 having disposed therein the choke 130 to the pipe 149 intermediate the chokes 114 and 115 as in the first embodiment of the invention.

The pressure chamber (not shown) in the locking cylinder 9 is connected by a pipe 150 to the hereinbefore-mentioned pipe 145 intermediate the ends thereof.

The inlet of the check valve 123 is connected by a pipe 151 to the pipe 145 intermediate the ends thereof, and the outlet of this check valve 123 is connected to the pipe 90 intermediate the ends thereof by a pipe 152.

When a new railway car that is provided with the variable-load brake control equipment shown in FIG. 2 is completed in a railway car builder's shop, this equipment may be charged in the same manner as hereinbefore described for the brake equipment shown in FIG. 1 after which a full-service brake application on the car is effected in the same manner as for the brake equipment constituting the first embodiment of the invention, it being understood that the brake control valve device 1 operates to effect the supply of fluid under pressure from the auxiliary reservoir 3 to the brake cylinder pipe 12 which is connected to the chamber 136 in the compensating-type brake cylinder 135.

It will be noted that the new car is empty and no fluid under pressure is present in the chamber 144 at this time. Consequently, fluid under pressure will now flow from the auxiliary reservoir 3 to the chamber 136 in brake cylinder 135 until equalization of pressure occurs between the auxiliary reservoir 3 and the chamber 136. The equalization pressure thus obtained in the chamber 136 provides an adequate braking force for a fully loaded car. However, since the new empty car is at rest, there is no sliding of the wheels.

The above-mentioned full service brake application can now be released in the same manner as hereinbefore described for the brake equipment shown in FIG. 1.

Upon the service portion 11 of the brake control valve device 1 connecting the brake cylinder pipe 12 to the pipe 52, fluid under pressure present in the chamber 136 in the brake cylinder 135 will flow to atmosphere via pipe 12, service portion 11, pipe 52 and retaining valve device 52a now in its direct exhaust position whereupon the spring 148 returns the piston 140 to the position shown in FIG. 2 thereby releasing the brakes on the car.

Some of the fluid under pressure vented from the brake cylinder 135 via the pathway described above will flow from the pipe 52 to the fluid motor 8 via pipe 149 and the chokes 115 and 114 disposed therein, and this fluid under pressure will flow to atmosphere via the nozzle 124 in the same manner as hereinbefore described for the first embodiment of the invention. Consequently, the fluid motor 8 operates the self-lapping valve device 7 in the same manner as hereinbefore described to cause this valve device 7 to effect the supply of fluid under pressure from the brake pipe 2 to the pipe 145 which is connected to the compensating chamber 144 in the brake cylinder device 135 and to the pipe 150 which is connected to the locking cylinder 9. Accordingly, the self-lapping valve mechanism of the valve device 7 is locked by the locking cylinder 9 in whatever position this valve mechanism is moved to by the fluid motor 8 as in the first embodiment of the invention.

From the foregoing, it is apparent that when the above-mentioned full-service brake application on the new empty railway car is subsequently released, the self-lapping valve device 7 is operated by the fluid motor 8 to supply a maximum pressure of fluid from the brake pipe 2 to the compensating chamber 144 in the brake cylinder 135.

Let it now be supposed that this new railway car is coupled into a train to be hauled from the car builder's shop to the property of its owner. Let it be also supposed that while thus en route, a full-service brake application on all cars in the train is effected in the usual manner. Upon effecting a full-service brake application, the brake control valve device 1 operates to effect the supply of fluid under pressure from the auxiliary reservoir 3 to the chamber 136 in the brake cylinder device 135 until equalization of pressure between the reservoir 3 and chamber 136 occurs.

Referring to FIG. 2, it will be understood that the pressure of fluid in chamber 136 and acting over the full area of the brake cylinder piston 140 will prevail over the opposing pressures of the spring 148 and of the fluid in chamber 144, acting over that portion of the piston 140 which serves to define the chamber 144, in an amount sufficient to transmit a braking force to the brake rigging for braking an empty car to the degree called for by the full-service reduction of pressure in the brake pipe 2.

Let is now be supposed that this new empty car is set off from the train on a siding where it is to be partially or fully loaded. When this empty car is thus set off from the train, the brake pipe 2 will be completely vented of fluid under pressure.

Upon thus completely venting the brake pipe 2, fluid under pressure in the locking cylinder 9 will flow to atmosphere via pipe 150, pipe 145, pipe 151, check valve 123, pipe 152, pipe 90, and brake pipe 2 it being understood that an angle cock (not shown) in the brake pipe 2 at one end of the car occupies its open position. It will be also noted that at this time the fluid under pressure present in the chamber 144 in the brake cylinder 135 will flow to the atmosphere via pipe 145, pipe 151, check valve 123, pipe 152, pipe 90 and brake pipe 2 until all fluid under pressure is released from the chamber 144.

Also, upon thus completely venting the brake pipe 2, the brake control valve device 1 will operate in the manner explained in hereinbefore-mentioned U.S. Pat. No. 2,031,213 to cause an emergency brake application on the empty car, it being noted that, upon thus effecting an emergency brake application, the brake control valve device 1 operates to connect both the auxiliary reservoir 3 and the emergency reservoir 4 to the chamber 136 in the brake cylinder device 135 to thereby obtain a higher pressure in this chamber and therefore a corresponding higher braking force on the car at this time. Since the car is now at rest on a siding, there is no sliding of the car wheels.

As in the first embodiment of the invention, when fluid under pressure is released from the fluid motor 9 to atmosphere, the piston rod 119 is withdrawn from the corresponding serration 99 in the rack member 98. This unlocks the self-lapping valve device 7 whereupon the parts thereof are returned to the position in which they are shown in FIG. 1 of the drawings.

As in the first embodiment of the invention, it is apparent that as the load on the car is increased, the needle valve 125 is moved downward relative to nozzle 124. Therefore, this needle valve 125 provides a maximum restriction to the flow of fluid under pressure from the nozzle 124 when the car is empty and a minimum or no restriction to this flow when the car is fully loaded.

Let it be supposed that while the car is sitting on the siding, it is fully loaded. Consequently, this load is effective to deflect the car springs 132 and move the needle valve 125 carried on the bolster 131 to the position in which this needle valve provides no restriction to the flow of fluid under pressure from the nozzle 124 to atmosphere. Let it now be supposed that this car is picked up from the siding. When thus connected into a train, the brake control valve device 1 operates in response to the charging of the brake pipe 2 to release fluid under pressure from the chamber 136 in the brake cylinder 135 to atmosphere until the pressure in this chamber 136 is reduced to atmospheric pressure.

As fluid under pressure is thus released from the chamber 136, the spring 148 causes the piston 140 to return to the position shown in FIG. 2 thereby releasing the brakes on the car.

Fluid under pressure released from the chamber 136 flows via the brake cylinder pipe 12, the service portion 11, now in its release position, the pipe 52 and the retaining valve device 52a now in its direct exhaust position to atmosphere. Some of the fluid under pressure supplied from the chamber 136 to the pipe 52 slows from this pipe 52 via the pipe 149 having chokes 115, 114 therein to the fluid motor 8. This fluid under pressure that is supplied to the fluid motor 8 flows to the atmosphere via chokes 114 and 130, pipe 129, the flexible hose 128 and the nozzle 124, it being noted that the needle valve 125 now offers no restriction to the flow of fluid under pressure from the nozzle 124 to atmosphere. Consequently, there will be no buildup of fluid pressure in the chamber 112 (FIG. 1) of the fluid motor 8. Accordingly, fluid motor 8 is not operated to cause operation of the self-lapping valve device 7 to effect the supply of fluid under pressure from the brake pipe 2 to the chamber 144 in the brake cylinder 135 at the time the previously effected emergency brake application is subsequently released.

If now the pressure in the brake pipe 2 is reduced in the usual manner, the brake control valve device 1 on the now fully loaded car will operate to effect the supply of fluid under pressure from the auxiliary reservoir 3 to the chamber 136 to establish a pressure in chamber 136 corresponding to the degree of reduction of pressure effected in the brake pipe 2.

It will be remembered that no fluid under pressure is now present in the chamber 144. Therefore, the fluid under pressure supplied by the brake control valve device 1 to the chamber 136 will be effective over the entire area of the piston 140, and the brake cylinder device 135 will exert a braking force sufficient to brake a fully loaded car.

In view of the above, it is apparent that if the car is partially loaded the upper end of the needle valve is not disposed below the mouth 124 but extends into the nozzle a distance that varies inversely as the weight of the load on the car. Accordingly, as in the first embodiment of the invention, the position of the needle valve 125 relative to the nozzle 124 determines the pressure built up in the chamber 144 of a brake cylinder device 135 in response to the operation of the self-lapping valve device 7 by the fluid motor 8. Therefore, the establishment of a pressure in the chamber 144 of the brake cylinder device 135 that varies inversely at the weight of the load on the car, insures the provision of a braking force on the car, upon subsequently effecting a brake application, that is in accordance with the load carried thereon.

According to a third embodiment of the invention, a load-sensing apparatus 153 that includes a fluidic proportional amplifier 154, which is shown in detail in FIG. 3, replaces the jet-type load-sensing apparatus 10 shown in FIG. 1 to provide a variable-load fluid pressure brake equipment that functions substantially the same as the variable-load fluid pressure brake equipment shown in FIG. 1. It should be understood that the brake equipment constituting this third embodiment of the invention includes the brake control valve device 1, the brake pipe 2, the auxiliary reservoir 3, the emergency reservoir 4, the self-lapping relay valve device 5, the brake cylinder 6, the self-lapping valve device 7 and the locking cylinder 9 shown in FIG. 1 but omitted from FIG. 3 in the interest of simplification of the drawings. Accordingly, like reference numerals have been used to designate the structure shown in FIG. 3 which is identical with that shown in FIG. 1 and already described. Only such features of the structure and operation of the embodiment of FIG. 3 which differ from that of the embodiment of FIG. 1 will be hereinafter described.

According to the embodiment of the invention shown in FIG. 3, the load sensing apparatus 153 comprises, in addition to the fluidic proportional amplifier 154, a flexible hose 155 the lower end of which is secured to an unsprung part of a railway vehicle, such as, for example, the truck side frame 126 by a bracket member 156 and a pair of cap screws 157.

As shown in FIG. 3, an annular guide member 158 is disposed below the bracket member 156 and secured to the truck side frame 126 by a pair of capscrews 159. Coaxially arranged with the lower end of the hose 155 is a needle valve 160 which is formed integral with and extends upward from the bottom of a cup-shaped member 161 that has a sliding fit with the annular guide member 158 and is supported on a boss 162 formed on the right-hand end of a lever 163.

It should be noted that the lower end of the hose 155 and the needle valve 160 constitute a variable resistor or orifice.

For example, substantially three-fourths of its length from its left-hand end, the lever 163 is rockably mounted on a fulcrum or bolt 164 that is secured to the truck side frame 126 by a nut (not shown).

Formed on the left-hand end of the lever 163 is a clevis 165 the jaws of which are provided with an elongated slot 166. Disposed between the jaws of the clevis 165 is one end of a rod 167 which is operatively connected to the lever 163 by a pin 168 and a pair of cotter pins 169 only one of which appears in FIG. 3. This rod 167 extends upward between the two truck springs 132 and through a bore 170 formed in the lower leg of a Z-shaped bracket 171 the upper leg of which is secured to the bottom of the truck bolster 131 by a capscrew 172. As can be seen from FIG. 3, the length of the rod 167 is such that its upper end abuts the lower side of the truck bolster 131. Accordingly, as the load on the car body, one end of which body is supported by the bolster 131, is increased, the springs 132 are correspondingly compressed whereupon the truck bolster 131 and the rod 167 are moved downward. As the rod 167 is thus moved downward, it is effective to rock the lever 163 counterclockwise about the bolt 164 to thereby move the cup-shaped member 161 and needle valve 160 integral therewith upward so that this needle valve further restricts the flow of fluid under pressure from the lower end of the hose 155 to atmosphere.

The fluidic proportional amplifier 154 includes a supply port 173, a pair of opposing control inputs 174 and 175 and a pair of outputs 176 and 177. The supply input 173 is connected by a pipe 178 having therein a dropping choke 179 to the exhaust pipe 51 (FIG. 1) through which fluid under pressure from the brake cylinder 6 (FIG. 1) is released to atmosphere via pipe 52 (FIG. 1) and the retaining valve device 52a when effecting a brake release. The dropping choke 179 reduces the pressure released from the brake cylinder 6 to a pressure suitable for operation of pure fluid devices. The control input 174 is connected to the pipe 178 via a linear restrictor 180 so that the pressure at control input 174 is substantially proportional to brake cylinder pressure but is sufficiently reduced to provide pressure within a range suitable for pure fluid devices. The control input 175 is connected to the hose 155 via a pipe 181. A pipe 182 has one end connected to the pipe 181 intermediate the ends thereof and its opposite end connected to the pipe 178 adjacent the supply port 173. A second linear restrictor 183 is disposed in the pipe 182 intermediate the ends thereof. The linear restrictors 180 and 183 comprise a plurality of comparatively long parallel spaced-apart small square holes or passageways, which, for example, may be 0.005 inch by 0.005 inch in cross section. These square holes or passageways open at their respective opposite ends into a manifold or chamber to which a pipe connection may be made.

Output 176 is open to atmosphere and output 177 is connected to the chamber 112 (FIG. 1) in the fluid motor 8 (FIG. 3) by a pipe 184.

It will be understood that the charging of the brake equipment on a new car provided the brake equipment constituting the third embodiment of the invention, subsequently effecting a full-service brake application, and thereafter releasing this full-service brake application can be sequentially effected in the same manner as hereinbefore described for the first and second embodiments of the invention. Accordingly, it will be understood that upon effecting the above-mentioned brake release, fluid under pressure will flow from the brake cylinder 6 (FIG. 1) to the pipe 178 (FIG. 3) and thence through the pressure dropping choke 179 therein.

Some of the fluid flowing from the outlet of the dropping choke 179 at a reduced pressure suitable for operation of pure fluid devices flows to the inlet of the linear restrictor 180, and the remainder is divided between the supply port 173 of the fluidic proportional amplifier 154 and the inlet of the second linear restrictor 183. The fluid flowing from the outlet of this linear restrictor 183 is at a pressure substantially less than the pressure of the fluid supplied to the inlet of this restrictor, and is divided between the control input 175 and the nozzle constituted by the lower end of the hose 155 as is apparent from FIG. 3 of the drawings.

Since the car is now empty, the needle valve 160 occupies the position shown in FIG. 3 thereby offering a minimum restriction to flow of fluid under pressure from hose 155 to atmosphere. This minimum restriction provided by the needle valve 160 insures sufficient pressure at supply port 173 and a sufficient outlet pressure at the linear restrictor 180 to provide a maximum pressure at outlet 177, which is connected by the pipe 184 to the fluid motor 8. It will be noted that the minimum restriction provided by the needle valve 160 at this time is not enough to cause a buildup of pressure at control input 175 which would reduce the flow to the output 177 and therefore the pressure built up in the chamber 112 (FIG. 1) of the fluid motor 8 (FIG. 3). Consequently, the flow of fluid under pressure from the outlet of control input 174 is effective to cause a maximum buildup of pressure at the output 177 from whence it flows to the chamber 112 (FIG. 1) of the fluid motor 8 (FIG. 3) via the pipe 184.

As fluid under pressure is supplied to the chamber 112 (FIG. 1) of the fluid motor 8 (FIG. 3) in the manner just described, this fluid motor 8 is operated in the same manner as hereinbefore described in connection with the fluid motor 8 shown in FIG. 1 to cause operation of the self-lapping valve device 7 of the brake equipment constituting the third embodiment of the invention in the same manner as hereinbefore described for the valve device 7 shown in FIG. 1.

It will be understood that operation of this valve device 7 effects the supply of fluid under pressure to the chamber 24 of the self-lapping relay valve device 5 of brake equipment constituting the third embodiment of the invention to cause this relay valve device 5 to operate in the same manner as hereinbefore described for the valve device 5 shown in FIG. 1 of the drawings to establish a pressure in the pressure chamber of the corresponding brake cylinder 6 to provide the proper braking force on the empty car.

Let it now be supposed that, subsequent to placing the new freight car provided with the brake equipment constituting the third embodiment of the invention in revenue service, the body of this car is partly loaded.

As a load is placed on the body of this car, it will be apparent from FIG. 3 that the weight of this load is transmitted to the springs 132 via the truck bolster 131 to cause deflection of these springs an amount corresponding to this weight. As the springs 132 are thus deflected, the truck bolster 131 will be moved downward, as viewed in FIG. 3, a corresponding amount. Accordingly, it will be apparent from FIG. 3 that this downward movement of the truck bolster 131 is effective via the rod 167 and pin 168 to correspondingly rock lever 163 counterclockwise, as viewed in FIG. 3, about its fulcrum or the bolt 164.

As previously explained, the fulcrum or bolt 164 is so located that the left-hand arm of the lever 163 is for example, three times the length of its right-hand arm. Accordingly, as the lever 163 is rocked counterclockwise in the manner described above, the needle valve 160 is moved upward one-third the distance that the truck bolster 131 and the rod 167 are moved downward as the result of partly loading the body of the car. It will be understood that the length of the arms of the lever 163 can be varied in accordance with the total deflection of the particular set of springs supporting the truck bolster 131.

As the needle valve 160 is thus moved upward relative to the lower end of the hose 155, this needle valve 160 is effective to restrict the flow of fluid under pressure from the hose 155 to atmosphere, the amount of restriction provided by this needle valve of course being proportional to the amount it is moved upward from the position shown in FIG. 3.

Upward movement of the needle valve 160 from the position shown in FIG. 3 to restrict the flow of fluid under pressure from the hose 155 to atmosphere is effective to cause a buildup or increase in the pressure in the pipes 181 and 182, at the outlet of the liner restrictor 183, and at the control input 175.

As the pressure at the control input 175 is thus increased, it is effective to deflect a part or a portion of the fluid flowing from the supply port 173 to the output 177 from this output 177 and thereby provide a proportionately increasing pressure at output 176 which is open to atmosphere. Accordingly, it will be understood that the pressure at the output 177 and in the chamber 112 (FIG. 1) of the fluid motor 8 (FIG. 3) connected to the output 177 via pipe 184 is correspondingly reduced. In other words, as the needle valve 160 is moved upward in response to the load placed on the body of the car to any position in which it further restricts the flow of fluid under pressure from the lower end of hose 155 to atmosphere, the pressure buildup in the chamber 122 (FIG. 1) of the fluid motor 8 (FIG. 3) is correspondingly reduced.

In view of the description of the operation of the self-lapping valve device 7 and the self-lapping relay valve device 5 hereinbefore given, it is apparent that the pressure established in the pressure chamber of the brake cylinder 6 of the brake equipment constituting the third embodiment of the invention will provide a braking force on the partly loaded car provided with this brake equipment that will adequately brake this partly loaded car.

From the foregoing, it is apparent that when the car is fully loaded, the needle valve 160 will occupy a position to cause maximum restriction to flow of fluid under pressure from the hose 155 to atmosphere. This, in turn is effective to correspondingly increase the pressure at the control input 175 to a maximum value which is effective to deflect all of the fluid flowing from the supply port 173 to the output 176 so that the pressure at output 176 is maximum and all of the fluid supplied to the supply port 173 flows to atmosphere via output 176.

Consequently, no fluid under pressure is supplied to the chamber 112 (FIG. 1) of the fluid motor 8 shown in FIG. 3. It follows, therefore, that the self-lapping valve device 7 of the brake equipment constituting the third embodiment of the invention is not operated to supply any fluid under pressure to the chamber 24 (FIG. 1) of the self-lapping relay valve device 5 of this brake equipment. Accordingly, when fluid under pressure is supplied to the chamber 20 (FIG. 1) of this relay valve device 5 in response to operation of the corresponding brake control valve device 1, this relay valve device 5 will be operated thereby to establish a corresponding maximum pressure in the pressure chamber of the brake cylinder 6 of this brake equipment which maximum pressure provides a braking force which is adequate to properly brake the now fully loaded car.

A fourth embodiment of the invention may be provided by replacing the jet-type load-sensing apparatus 10 shown in FIG. 2 of the drawings with the load-sensing apparatus 153 and fluidic proportional amplifier 154 shown in FIG. 3, it being understood that the upper end of the pipe 178 (FIG. 3) is connected to the pipe 52 (FIG. 2) intermediate the ends of this pipe 52. Consequently, when the brake equipment constituting the fourth embodiment of the invention is operated to effect a brake release, fluid under pressure released from the chamber 136 (FIG. 2) of the compensating-type brake cylinder 135 will flow to atmosphere via the brake control valve device 1 (FIG. 2), the pipe 52 and the retaining valve device 52a now in its direct exhaust position.

Since the upper end of the pipe 178 (FIG. 3) is now connected to the pipe 52 (FIG. 2) intermediate the ends thereof, as stated above, some of the fluid under pressure released from the chamber 136 (FIG. 2) of the brake cylinder 135 when effecting a brake release will flow from the pipe 52 (FIG. 2) to the upper end of the pipe 178 (FIG. 3) and thence through the dropping choke 179 to the fluidic proportional amplifier 154 (FIG. 3) and the hose 155 in the manner explained in connection with the third embodiment of the invention.

Accordingly, it will be apparent that the load-sensing apparatus 153 and the fluidic proportional amplifier 154 of the brake equipment constituting the fourth embodiment of the invention will now operate in the same manner as hereinbefore described in connection with the third embodiment of the invention to establish a maximum pressure in the pressure chamber 112 (FIG. 1) of the corresponding fluid motor 8 when the car is empty and establish no pressure in this chamber when the car is fully loaded. Therefore, it will be understood that the fluid motor 8 of the brake equipment constituting the fourth embodiment of the invention operates the corresponding self-lapping valve device 7 in the same manner as the valve device 7 (FIG. 2) of the brake equipment constituting the second embodiment of the invention. In view of the above, it will be understood that no fluid under pressure is supplied to the chamber 144 of the brake cylinder device 135 of the brake equipment constituting the fourth embodiment of the invention when the car provided with this brake equipment is fully loaded and a maximum pressure will be established in this chamber 144 when the car is empty. It will be further understood, in view of the foregoing, that when the car is partly loaded, a pressure is established in the chamber 144 which varies inversely as the weight of the load on the car.

Accordingly, it is apparent that the compensating-type brake cylinder 135 of the brake equipment constituting the fourth embodiment of the invention will always provide the proper braking force on the car on which this brake equipment is installed. In other words, as the load on the car is increased, this brake cylinder 135 provides a correspondingly greater braking force to properly brake the car.

Having now described the invention, what I claim as new and desire to secure by Letters Patent, is:

1. A variable-load braking system for a vehicle having a sprung part and an unsprung part, said braking system comprising:
   a. A self-lapping valve device operative to supply fluid under pressure to control the degree of a brake application on the vehicle, wherein the improvement comprises;
   b. fluid motor means having a pressure chamber to which fluid under pressure is supplied for operating said self-lapping valve device to supply a varying fluid pressure dependent on the pressure established in said pressure chamber; and
   c. load-sensing means controlled by the relative positions of the sprung and unsprung parts of the vehicle for establishing in said pressure chamber a pressure varying according to the variation in the load on the vehicle, said load-sensing means comprising:
      i. a nozzle carried by said unsprung part and via which fluid under pressure is released from the pressure chamber of said fluid motor means to atmosphere, and
      ii. a needle valve carried by said sprung part and coaxially disposed adjacent to said nozzle whereby movement of said needle valve in the direction away from said nozzle in response to an increase in load on the vehicle causes a corresponding reduction of the pressure established in the pressure chamber of said motor means.

2. A variable-load braking system, as recited in claim 1, further characterized in that said load-sensing means comprises:
   a. a lever pivotally mounted on said unsprung part and operably connected to said sprung part whereby said lever is rockable responsive to a change in load on said sprung part, and
   b. a needle valve coaxially disposed adjacent to said nozzle and operated by said lever such that rocking movement of said lever in response to an increase in load on said sprung part moves said needle valve in the direction toward said nozzle to cause a corresponding reduction of the pressure established in the pressure chamber of said fluid motor means.

3. A variable-load brake system for a vehicle, as claimed in claim 2, further characterized by a fluidic proportional amplifier operable by an increase in the back pressure established upon movement of said needle valve toward said nozzle to cause a corresponding reduction in the pressure established in the pressure chamber of said fluid motor means.

4. A variable-load braking system, as claimed in claim 1, further characterized by fluid pressure operated locking means for locking said self-lapping valve device against operation to reduce the pressure of fluid supplied thereby subsequent to operation thereof by said fluid motor.

5. A variable-load braking system, as claimed in claim 4, further characterized by valve means operative to release fluid under pressure from said locking means, and by biasing means for operating said locking means to unlock said self-lapping valve device subsequent to operation of said valve means to release fluid under pressure from said locking means.

6. A variable-load braking system, as claimed in claim 4, further characterized in that said fluid pressure operated locking means is operated to a locking position by fluid under pressure supplied from said self-lapping valve device upon operation thereof by said fluid motor means.

7. A variable-load braking system for a vehicle having a sprung part and an unsprung part, said braking system comprising:
   a. a fluid pressure operated braking means for effecting a brake application on the vehicle,
   b. relay valve means for effecting the supply of fluid under pressure to and the release of fluid under pressure from said fluid pressure operated braking means, said relay valve means having an operating abutment and pressure chambers on opposite sides thereof for receiving fluid under pressure to act opposingly on said abutment, said relay valve means being operated to establish a pressure in said braking means in accordance with the differential of pressure in one of said chambers over that in the other of said chambers,
   c. a fluid pressure responsive brake control valve device operative to effect the supply of fluid under pressure to the said one chamber of said relay valve means,
   d. a self-lapping valve device operative to supply fluid under pressure to the said other chamber of said relay valve means to control the degree of a brake application; wherein the improvement comprises:
   e. fluid motor means having a pressure chamber to which fluid under pressure is supplied for operating the self-lapping valve device to supply a varying fluid pressure to the said other chamber of said relay valve means dependent on the pressure established in the said pressure chamber, and
   f. load-sensing means controlled by the relative positions of the sprung and unsprung parts of the vehicle for establishing in the pressure chamber of said fluid motor means a pressure varying according to the variation in the load on the vehicle.

8. A variable-load braking system for a vehicle, as claimed in claim 7, further characterized by means through which the fluid under pressure released from said fluid pressure braking means by operation of said relay valve means is supplied to the said pressure chamber of said fluid motor means to cause the operation thereof.

9. A variable-load braking system for a vehicle, as claimed in claim 7, wherein said load-sensing means comprises:

a. a nozzle carried by said unsprung part and via which fluid under pressure is released from the pressure chamber of said fluid motor means to atmosphere, and b. a needle valve carried by said sprung part and coaxially disposed adjacent to said nozzle whereby movement of said needle valve in the direction away from said nozzle in response to an increase in load on the vehicle causes a corresponding reduction of the pressure established in the pressure chamber of said fluid motor means, and wherein said braking system is further characterized by means through which fluid under pressure released from said fluid pressure braking means by operation of said relay valve means, is supplied simultaneously to the said pressure chamber of said fluid motor means and to said nozzle.

10. A variable-load braking system for a vehicle, as claimed in claim 9, further characterized in that said means, through which fluid under pressure released from said braking means is supplied to said pressure chamber and said nozzle, includes choke means which controls the degree of pressure of fluid supplied to the said pressure chamber and said nozzle.

11. A variable-load braking system for a vehicle, as claimed in claim 9, further characterized in that said means, through which fluid under pressure released from said braking means is supplied to said pressure chamber and said nozzle, includes a pair of chokes, one of which controls the degree of pressure supplied to the pressure chamber of said fluid motor means, and the other of which controls the degree of pressure supplied to said nozzle.

12. A variable-load braking system for a vehicle having a sprung part and an unsprung part, said braking system comprising:

a. a brake pipe normally charged to a certain chosen pressure, b. fluid pressure operated braking means for effecting a brake application on the vehicle, c. a fluid pressure operated relay valve means for effecting the supply of fluid under pressure to and the release of fluid under pressure from said fluid pressure operated braking means, said relay valve means having an operating abutment and pressure chambers on opposite sides thereof for receiving fluid under pressure to act oppositely on said abutment, said relay valve means being operative to establish a pressure in said braking means in accordance with the differential of pressure in one of said chambers over that in the other of said chambers, d. a fluid pressure responsive brake control valve device operative upon a reduction in pressure from said certain chosen pressure in said brake pipe to effect the supply of fluid under pressure to the said one chamber of said relay valve means to cause said relay valve means to effect a supply of fluid under pressure to said braking means in accordance with the degree of pressure in said one chamber, e. a self-lapping valve device operative to supply fluid under pressure to the said other chamber of said relay valve means wherein the improvement comprises:

f. fluid motor means having a pressure chamber to which fluid under pressure is supplied for operating said self-lapping valve device to supply a varying fluid pressure to the said other chamber of said relay valve means dependent on the pressure established in the said pressure chamber of said fluid motor, and g. load-sensing means controlled by the relative positions of the sprung and unsprung parts of the vehicle for establishing in the said pressure chamber of said fluid motor a pressure varying according to variation in the load on the vehicle.

13. A variable-load braking system, as claimed in claim 12, further characterized by fluid pressure operated locking means for locking said self-lapping valve device against operation to reduce the pressure of fluid supplied thereby subsequent to operation thereof by said fluid motor means, and by one-way valve means providing for flow of fluid under pressure from said fluid pressure operated locking means to said brake pipe to cause said locking means to unlock said self-lapping valve device.

14. A variable-load braking system, as claimed in claim 13, wherein said one-way valve means is operative to release fluid under pressure from said locking means to said brake pipe only subsequent to a chosen reduction in the pressure in said brake pipe.

15. A variable-load braking system for a vehicle having a sprung part and an unsprung part, said braking system comprising:

a. a fluid pressure operated braking means for effecting a brake application on the vehicle, said braking means having a differential type of piston one side of which has a greater effective area than the other, b. a fluid pressure responsive brake control valve device operative to effect the supply of fluid under pressure to the one side of the differential type of piston having the greater effective area, c. a self-lapping valve device operative to supply fluid under pressure to the other side of the differential type of piston of said fluid pressure operated braking means to cause it to provide a braking force for braking the vehicle in accordance with the difference in the fluid pressure forces acting on the opposite sides of the differential type of piston of said braking means, wherein the improvement comprises:

d. fluid motor means having a pressure chamber to which fluid under pressure is supplied for operating the self-lapping valve device to supply a varying fluid pressure to the other side of the differential type of piston dependent on the pressure established in the said pressure chamber, and e. load-sensing means controlled by the relative positions of the sprung and unsprung parts of the vehicle for establishing in the pressure chamber of said fluid motor means a pressure varying according to the variation in the load on the vehicle.